United States Patent [19]
Martinez

[11] Patent Number: 5,701,806
[45] Date of Patent: Dec. 30, 1997

[54] INSTALLATION FOR THE PREPARATION OF BREAD DOUGH PORTIONS

[76] Inventor: Eulalia Puig Martinez, c/550 No. 36, 46184 La Cañada (Valencia), Spain

[21] Appl. No.: 704,365

[22] Filed: Aug. 28, 1996

[30] Foreign Application Priority Data

Oct. 31, 1995 [ES] Spain ................... 9502116

[51] Int. Cl.⁶ ................ A23P 1/00; A21B 1/00; A21C 5/00; A21D 6/00
[52] U.S. Cl. ............... 99/353; 99/355; 99/443 C; 99/477; 425/142; 425/145; 425/308
[58] Field of Search ................ 99/443 R, 443 C, 99/477–479, 353–355, 467, 516, 534; 264/40.7, 412; 425/142, 145, 92, 308, 373, 101, 297, 200, 517; 426/503, 512

[56] References Cited

U.S. PATENT DOCUMENTS

| | | | |
|---|---|---|---|
| 4,726,766 | 2/1988 | Stewart | 99/443 C |
| 4,751,877 | 6/1988 | Andersson | 99/443 C |

*Primary Examiner*—Timothy F. Simone
*Attorney, Agent, or Firm*—Darby & Darby

[57] ABSTRACT

An installation for the preparation of bread dough portions includes a pre-fermentation chamber and a bread stick forming machine disposed on the chamber. The chamber and machine are joined by a conveyance mechanism that includes a lifting device, a lower conveyor that moves the bread dough portions from the outlet of the chamber to the start of the lifting device and an upper conveyor that starts at the end of the lifting device and moves the bread dough portions to the inlet opening of the machine. The lifting device can be made of conveyor belts or a scoop chain.

17 Claims, 2 Drawing Sheets

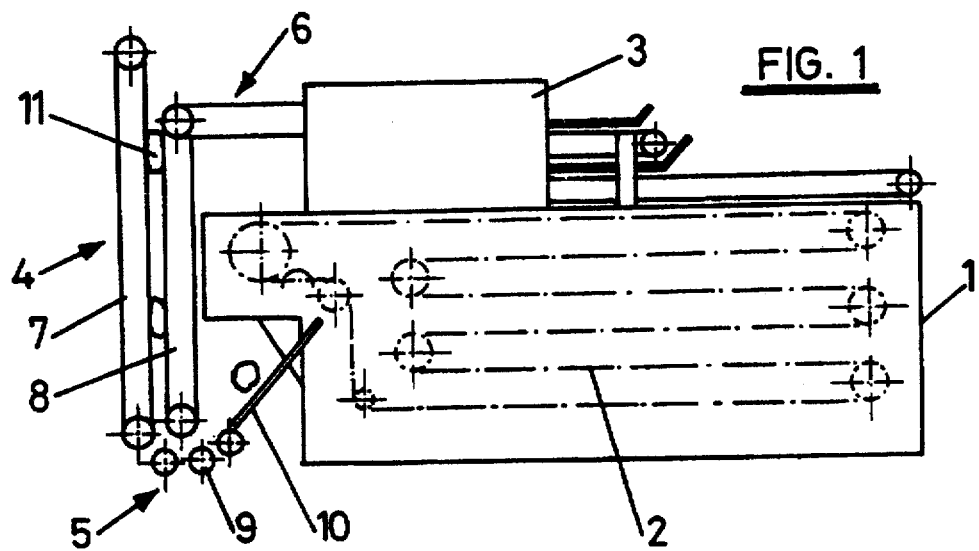
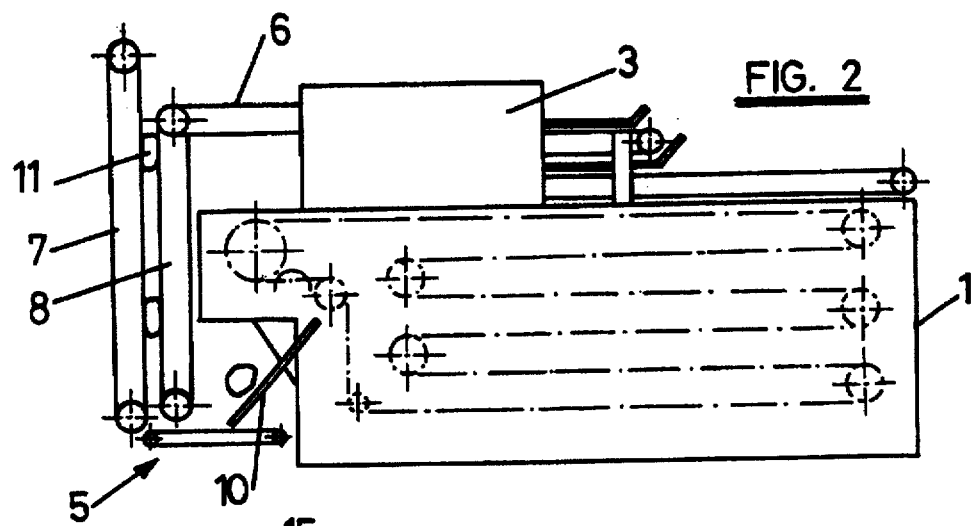
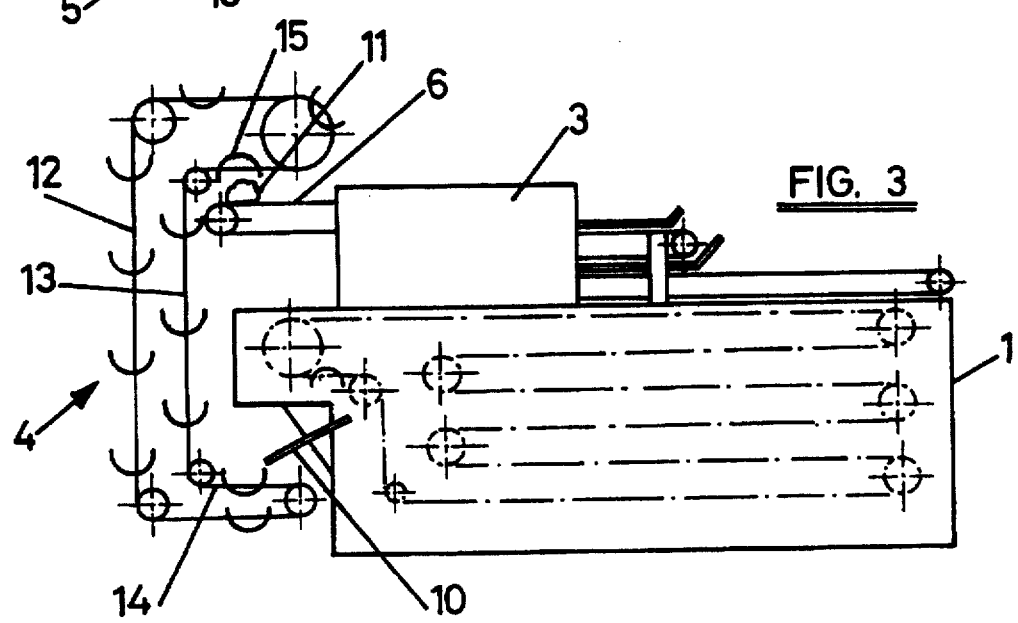

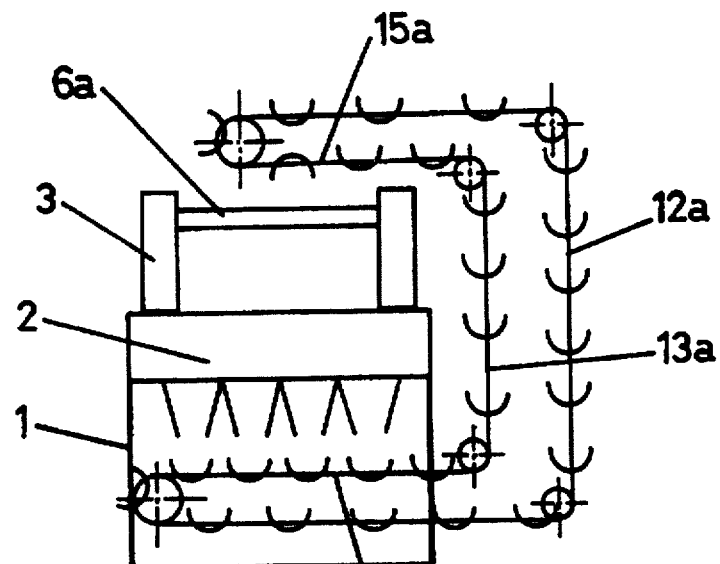
FIG. 4
FIG. 5
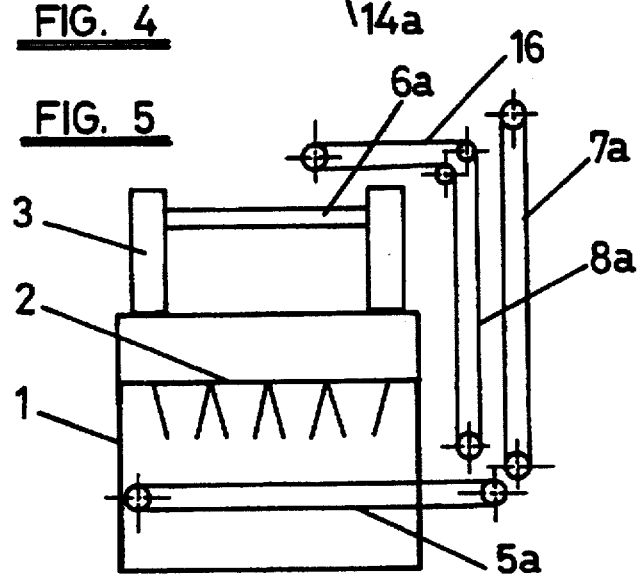
FIG. 6
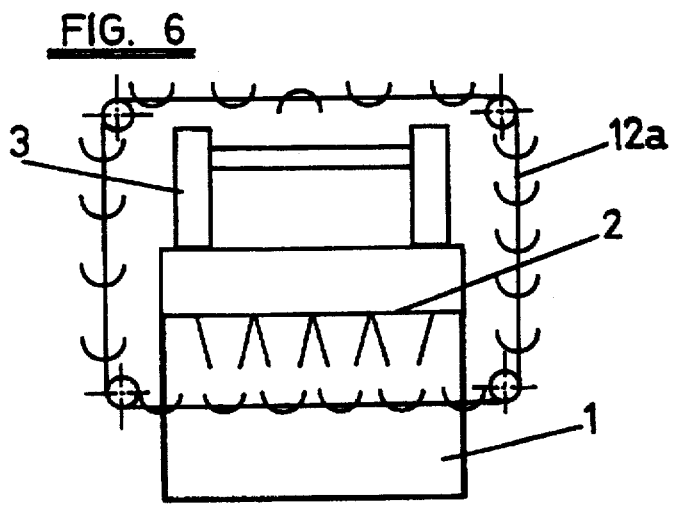

INSTALLATION FOR THE PREPARATION OF BREAD DOUGH PORTIONS

BACKGROUND OF THE INVENTION

1. Field of the Invention

This invention refers to an installation for the preparation of bread dough portions, made up of a pre-fermentation or resting chamber and a bread dough stick forming machine.

In traditional bread making installations the bread stick forming machine is located after the pre-fermentation machine, both of them located on the ground, which results in a number of problems whenever they are assembled inside small shops or any other kind of premises.

This drawback may be solved through a proper design of the pre-fermentation chamber, thus enabling the forming machine to be located upon it.

Notwithstanding this, the fundamental drawback of the facilities discussed, whichever may the relative position taken up by the pre-fermentation chambers and the bread stick forming machine be, is the conveyance of the bread dough portions from the pre-fermentation chamber to the bread stick forming machine. This operation is manually effected and requires at least one operator, which results in higher process costs and a similarly higher bread dough contamination risk due to the manual handling of the bread dough.

SUMMARY OF THE INVENTION

The object of this invention is an installation that solves the previously mentioned drawbacks.

On the one hand, in the installation object of this invention the bread stick forming machine is located above the pre-fermentation chamber, which reduces the surface taken up by these components. On the other hand, in the installation object of this invention the conveyance of the bread dough portions from the pre-fermentation chamber to the forming machine is effected automatically, not requiring any labor whatsoever, which helps reduce manufacturing labor costs and dough contamination risks.

In accordance with this invention, the fermentation chamber and the forming machine are joined by a conveyance mechanism that takes the bread dough portions from the outlet opening of the pre-fermentation chamber to the inlet opening of the forming machine. This mechanism is made up of a bread dough portion lifting device, a lower conveyor that carries the bread dough portions from the outlet opening of the chamber up to the start of the lifting device, and an upper conveyor that starts off the end of the lifting device and goes up to the load opening of the forming machine. The bread dough portion lifting device starts off at a point located at a height close to that of the outlet opening of the chamber, preferentially below the opening, and reaches approximately up to the height of the load opening of the forming machine.

The bread dough portion lifting device may be made up of two vertical conveyor belts, placed in parallel and close to each other, which each have forward moving tracks that travel at the same speed and in the same direction and are separated by a distance slightly lesser than the diameter of the bread dough portions. These belts start at a height lower than that at which the outlet opening of the resting chamber is located, reaching up to a height equal to or greater than that where the inlet opening of the forming machine is located. The lower and upper conveyors shall be located between the above two openings and the starting and ending points of the lifting device belts. The bread dough portion lifting device may also be made up of at least one vertical scoop chain, which has a forward moving track that starts under the outlet opening of the fermentation chamber and ends near the inlet opening of the forming machine, up to which the dough portions are taken by means of a ramp or a conveyor belt.

The conveyance belts or scoop chains that make up the bread dough portion lifting device may be located after the pre-fermentation chamber, in a position approximately across the outlet and inlet openings of the chamber and forming machine. The forward moving track being extends at the lower and upper ends in order to run under the outlet opening of the resting chamber and spill upon the load opening of the forming machine.

BRIEF DESCRIPTION OF THE DRAWING FIGURES

The features herein described, as well as others specific to the invention, duly set out in the claims, are now shown with a greater level of detail, with the help of the attached drawings, which represent in schematic fashion possible manners of execution, provided exclusively as non limitative examples.

FIG. 1 is a side elevation view of an installation set out according to the invention, that includes a lifting mechanism made up of belts, located after the pre-fermentation chamber.

FIG. 2 shows an installation equal to that shown in FIG. 1, including an execution variant in the lower conveyor.

FIG. 3 is an installation equal to that shown in FIGS. 1 and 2, in which the elevation mechanism is made up of at least one vertical scoop chain.

FIGS. 4 to 6 are front elevation views of three installations in which the lifting mechanism is arranged crosswise in respect of the resting chamber and forming machine.

DETAILED DESCRIPTION OF A PREFERRED EMBODIMENT

FIG. 1 represents an installation for the preparation of bread dough portions, made up of a bread dough portion pre-fermentation or resting chamber 1, inside which the scoop chain or chains 2 run as per horizontal tracks-long enough to allow the height of the structure of the assembly to be lowered, even if its length is consequently stretched. Thus chamber 1 defines a base upon which the bread stick forming machine 3 may then be suitably placed.

This arrangement allows the surface taken up by the facility to be reduced, due to the forming machine 3 being placed upon the resting chamber 1.

According to the invention, the resting chamber 1 and the forming machine 3 are joined up by a conveyance mechanism that allows the dough portions to be transported automatically from the Outlet opening of chamber 1 up to the inlet opening of forming machine 3, without the dough portions having to be manually handled by the operator.

The previously mentioned conveyance mechanism is made up of a bread dough portion lifting device 4, a lower conveyor 5, that conveys the bread dough portions from the outlet opening of chamber 1 up to the start of lifting device 4, and by an upper conveyor 6 that starts off the end of lifting device 4 and travels up to the loading opening of forming machine 3. In the example shown in FIG. 1 the lifting mechanism is made up of two vertical conveying belts, marked by item numbers 7 and 8, which travelling tracks run parallel and close to each other and travel at the same speed in the upward direction. These forward moving tracks will be kept apart from each other by a distance slightly lower than the diameter of the bread dough portions.

The lower conveyor 5 is made up, in the installation shown in FIG. 1, of a set of rollers 9 up to which the bread dough portions arrive through an outlet ramp 10 of chamber 1. On the other hand, the upper conveyor is made up of a conveyor belt that may consist of an extension of the belt 8 of the lifting device, which is that which is located closer to chamber 1, extension that will be aimed towards the inlet opening of forming machine 3.

The installation shown in FIG. 2 is similar to that described with reference to FIG. 1, being the only difference the substitution of the lower conveyor 5 by a conveyor belt.

FIGS. 1 and 2 represent a bread dough portion 11 located between belts 7 and 8 that make up the lifting device 4.

The various tapes shall be fitted upon driving, freely turning and direction changing rollers.

In the execution shown in FIG. 3 the bread dough lifting device 4 is made up of a scoop chain 12 which travelling track, marked with item number 13, includes a portion 14 that starts and runs under the outlet opening of the fermentation chamber 1, as well as a portion 15 that is aimed towards the forming machine 3 and ends near its loading opening. With this arrangement, the bread dough portions that come out of the resting chamber 1, by way of the ramp 10, fall onto the scoops in portion 14 of the travelling track of the conveyor belt, moving up until they reach portion 15 in which the scoops are inverted and spill upon the upper conveyor 6, made up of a conveyor belt, which receives the dough portions 11 and takes then inside forming machine 3.

In the executions described, the bread dough lifting machine, made up of scoop chains or belts, is arranged after the resting chamber and forming machine, in positions approximately across the outlet and inlet openings of the previously mentioned components. Notwithstanding this, the conveying mechanism may be placed crosswise in respect of chamber 1 and machine 3, as shown in FIGS. 5 and 6.

In FIG. 4 the conveyance mechanism is made up of a scoop chain 12a placed on a side of the set made up of the resting chamber 1 and the forming machine 3. The forward moving track 13a of this chain has a lower portion 14a that runs under the fall or outlet of the scoops of chain 2 of the resting chamber, whereas upwardly it extends in a track 15a in which the scoops spill the bread dough portion conveyed upon a belt 6a that reaches the inlet opening of forming chamber 3.

In chain 12a the scoops will be arranged so that in track 14a each one receives one of the portions that fall from the various bags of the resting chamber 1 scoops.

In the execution shown in FIG. 5 the conveyance mechanism takes up the same position that in FIG. 4, being the lifting device made up of vertical belts 7a and 8a, the second of which extends upwardly in a track 16 that spills upon conveyance belt 6a that reaches the inlet opening of forming machine 3. The lower conveyor is made up of a conveyor belt 5a that runs below the bag fall of the scoops of chain 2 of chamber 1 and which travels up to the beginning of the vertical belts 7a–8a.

Finally, FIG. 6 represents an execution similar to that of FIG. 4, in which the only difference is that the forward and reverse movement tracks of the scoop chain run on different sides in respect of chamber 1 and forming machine 3, making up a circuit that surrounds the chamber and machine in a crosswise fashion.

FIGS. 4 to 6 depict, with reference item 17, plates designed to lead the bread dough portions at the outlet of resting chamber 1.

In the executions shown in FIGS. 2 and 5,. the conveyor belt 5–5a that defines the lower conveyor is approximately tangential to the vertical belt 7–7a further away from chamber 1 and machine 3, whereas the nearest vertical belt 8–8a is kept away from the conveyor belt 5–5a by a distance in height that is equal or slightly greater than the diameter of the bread dough portions. This does then make it possible for the dough portions conveyed by belt 5–5a to reach the space defined between the vertical belts 7–8 and 7a–8a.

Whenever the lifting device is made up of vertical conveyance belts, the bread dough portions are then carried up held between the forward moving tracks of the two belts.

The installation object of this invention achieves an arrangement that makes it possible to reduce the surface taken it by it, and at the same time it makes available a conveyance mechanism that automatically carries the bread dough portions from the outlet opening of the resting chamber 1 up to the inlet opening of the forming machine 3, without requiring any manual labor whatsoever.

I claim:

1. An installation for the preparation of bread dough portions, comprising:

a bread dough portion pre-fermentation chamber having an outlet opening for dispensing bread dough portions;

a bread dough stick forming machine having an inlet opening for receiving the bread dough portions, said forming machine being disposed on said pre-fermentation chamber;

a conveyance mechanism that conveys the bread dough portions from the outlet opening of the chamber to the inlet of the forming machine, the mechanism including a bread dough portion lifting device that has a first end below the chamber outlet opening and a second end approximately at the height of the inlet opening of the forming machine, a lower conveyor conveys the bread dough portions from the outlet opening of the chamber to the first end of the lifting device, and an upper conveyor that has a first end adjacent to the second end of the lifting device and has a second end adjacent to the inlet opening of the forming machine, wherein the lifting device comprises at least one of conveyor belts and a vertical scoop chain.

2. The installation according to claim 1, wherein the lifting mechanism is comprised of two parallel and closely spaced vertical conveyor belts, which each have forward moving tracks that travel at essentially the same speed in essentially the same direction and are kept apart from each other by a distance slightly lesser than the diameter of the bread dough portions.

3. The installation according to claim 1, wherein the lifting device is comprised of at lease one vertical scoop chain, which has a forward moving track that starts and runs below the outlet opening of the chamber and ends near the inlet opening of the forming machine, the upper conveyor comprises of at least one of a ramp and a conveyor belt.

4. The installation according to claim 2, wherein the conveyor belts are disposed approximately across the outlet and inlet openings, respectively, of the chamber and forming machine.

5. The installation according to claim 3, wherein the scoop chains are disposed approximately across the outlet and inlet openings, respectively, of the chamber and forming machine.

6. The installation according to claim 2, wherein the conveyor belts are located on one side of the chamber and forming machine, and moves in a crosswise direction with respect to the chamber and forming machine.

7. The installation according to claim 3, wherein the scoop chains are located on one side of the chamber and forming machine, and moves in a crosswise direction with respect to the chamber and forming machine.

8. The installation according to claim 6, wherein the lower and upper conveyors are made up of at least one of conveyor belts and roller sets.

9. The installation according to claim 7, wherein the lower and upper conveyors are made up of at least one of conveyor belts and roller sets.

10. The installation according to claim 6, wherein the upper conveyor is comprised of an upper extension of the belt nearest the chamber and forming machine, the upper extension is directed towards the inlet opening of the forming machine, the other belt, which is furthest from the chamber and forming machine, slightly overlaps the upper extension.

11. The installation according to claim 7, wherein the upper conveyor is comprised of an upper extension of the belt nearest the chamber and forming machine, the upper extension is directed towards the inlet opening of the forming machine, the other belt, which is furthest from the chamber and forming machine, slightly overlaps the upper extension.

12. The installation according to claim 6, wherein the lower conveyor is comprised of a horizontal conveyor belt that extends to near and below the vertical belts, the vertical belt that is furthest from the chamber has a first end that is disposed approximately tangential to the horizontal belt, whereas the vertical belt nearest the chamber is spaced from the horizontal belt by a distance in height that is slightly greater than the diameter of the bread dough portions.

13. The installation according to claim 7, wherein the lower conveyor is comprised of a horizontal conveyor belt that extends to near and below the vertical belts, the vertical belt that is furthest from the chamber has a first end that is disposed approximately tangential to the horizontal belt, whereas the vertical belt nearest the chamber is spaced from the horizontal belt by a distance in height that is slightly greater than the diameter of the bread dough portions.

14. The installation according to claim 3, wherein the forward moving track and a backward moving track of the scoop chain run on the same side of the chamber and forming machine.

15. The installation according to claim 6, wherein the lifting device has a forward moving track and a rearward moving track, each of which run on the same side of the chamber and forming machine.

16. The installation according to claim 3, wherein the forward moving track and a backward moving track of the scoop chain run on different sides of the chamber and forming machine, thereby forming a circuit that surrounds the chamber and forming machine.

17. The installation according to claim 6, wherein the lifting device has a forward moving track and a rearward moving track, which run on different sides of the chamber and forming machine, thereby forming a circuit that surrounds the chamber and forming machine.

* * * * *